(12) United States Patent
Patenaude et al.

(10) Patent No.: US 7,420,467 B2
(45) Date of Patent: Sep. 2, 2008

(54) RFID ASSET MANAGEMENT METHOD AND SYSTEM FOR VEHICLES

(75) Inventors: Russell A. Patenaude, Macomb Township, MI (US); Anthony J. Sumcad, Southfield, MI (US)

(73) Assignee: General Motors Corporation, Detroit, MI (US)

( * ) Notice: Subject to any disclaimer, the term of this patent is extended or adjusted under 35 U.S.C. 154(b) by 201 days.

(21) Appl. No.: 11/200,981

(22) Filed: Aug. 10, 2005

(65) Prior Publication Data

US 2007/0035397 A1 Feb. 15, 2007

(51) Int. Cl.
*G08B 13/14* (2006.01)

(52) U.S. Cl. .............................. 340/572.1; 340/426.18; 340/572.4; 705/28

(58) Field of Classification Search .............. 340/572.1, 340/572.4, 5.92, 426.1, 426.18, 426.24, 426.31, 340/426.34; 235/385; 705/28
See application file for complete search history.

(56) References Cited

U.S. PATENT DOCUMENTS

| | | | |
|---|---|---|---|
| 6,236,911 B1 * | 5/2001 | Kruger | 340/425.5 |
| 6,898,489 B1 * | 5/2005 | Hayes, Sr. | 340/572.1 |
| 2002/0089434 A1 * | 7/2002 | Ghazarian | 340/988 |
| 2004/0069850 A1 * | 4/2004 | De Wilde | 235/385 |
| 2005/0035852 A1 * | 2/2005 | Paulsen | 340/426.1 |
| 2005/0134433 A1 * | 6/2005 | Sweeney | 340/10.1 |
| 2005/0203683 A1 * | 9/2005 | Olsen et al. | 701/35 |

* cited by examiner

*Primary Examiner*—Thomas J Mullen, Jr.

(57) ABSTRACT

A method for inventorying and monitoring an asset located in an vehicle asset management area. The method involves an inventorying of a presence of an asset within an vehicle asset management area based on a detection of a RFID tag associated with the asset within the vehicle asset management area, and a monitoring of the inventoried presence of the asset within the vehicle asset management area based on the RFID tag associated with the asset.

17 Claims, 6 Drawing Sheets

RFID ASSET MANAGEMENT METHOD AND SYSTEM FOR VEHICLES

FIELD OF THE INVENTION

The present invention generally relates to radio frequency identification ("RFID") technology. The present invention specifically relates to an incorporation of RFID technology in a technique for detecting and monitoring assets within a vehicle asset management area.

BACKGROUND OF THE INVENTION

A parked vehicle can be locked to prevent an unauthorized removal of an asset located in the parked vehicle. Examples of such an asset include, but are not limited to, a personal asset (e.g., money, a wallet, a purse, a compact disc, clothing, a piece of jewelry, a book, etc.) and a vehicle asset (e.g., a compact disc player, a seat, a steering wheel, etc.). Additionally, an asset can be securely mounted onto a parked vehicle in hope of preventing an unauthorized dismount of the asset from the parked vehicle (e.g., a bicycle, luggage, etc.).

While locking the parked vehicle and securely mounting an asset to a vehicle are helpful steps in preventing an unauthorized removal/dismount of an asset, there exists a need for creating an inventory system for logging in and out assets to thereby facilitate a monitoring of the assets whereby a notification can be provided for any unauthorized removal/dismount of the asset from the vehicle. The present invention addresses this need and advances the state of the art for monitoring assets located in or mounted upon a vehicle.

SUMMARY OF THE INVENTION

One aspect of the present invention provides a method comprising an inventorying of a presence of an asset within a vehicle asset management area based on a detection of a RFID tag associated with the asset within the vehicle asset management area, and a monitoring of the inventoried presence of the asset within the vehicle asset management area based on the RFID tag associated with the asset.

Another aspect of the invention provides a computer readable medium comprising computer readable code for inventorying a presence of an asset within a vehicle asset management area based on a detection of a RFID tag associated with the asset within the vehicle asset management area, and computer readable code for monitoring the inventoried presence of the asset within the vehicle asset management area based on the RFID tag associated with the asset.

Another aspect of the invention provides a telematics system comprising one or more RFID readers and a telematics unit. The RFID reader(s) is(are) operable to communicate with a RFID tag associated with an asset located in a vehicle asset management area. The telematics unit is operable to communicate with the RFID reader(s), to inventory a presence of the asset within a vehicle asset management area based on a detection of the RFID tag associated with the asset within the vehicle asset management area by the RFID reader(s), and to monitor an inventoried presence of the asset within the vehicle asset management area based on the detection of the RFID tag associated with the asset within the vehicle asset management area by the RFID reader(s).

The aforementioned and other features and advantages of the invention will become further apparent from the following detailed description of the various embodiments of the invention read in conjunction with the accompanying drawings. The detailed description and drawings are merely illustrative of the invention rather than limiting, the scope of the invention being defined by the appended claims and equivalents thereof.

DETAILED DESCRIPTION OF THE PREFERRED EMBODIMENTS

Figure 1:
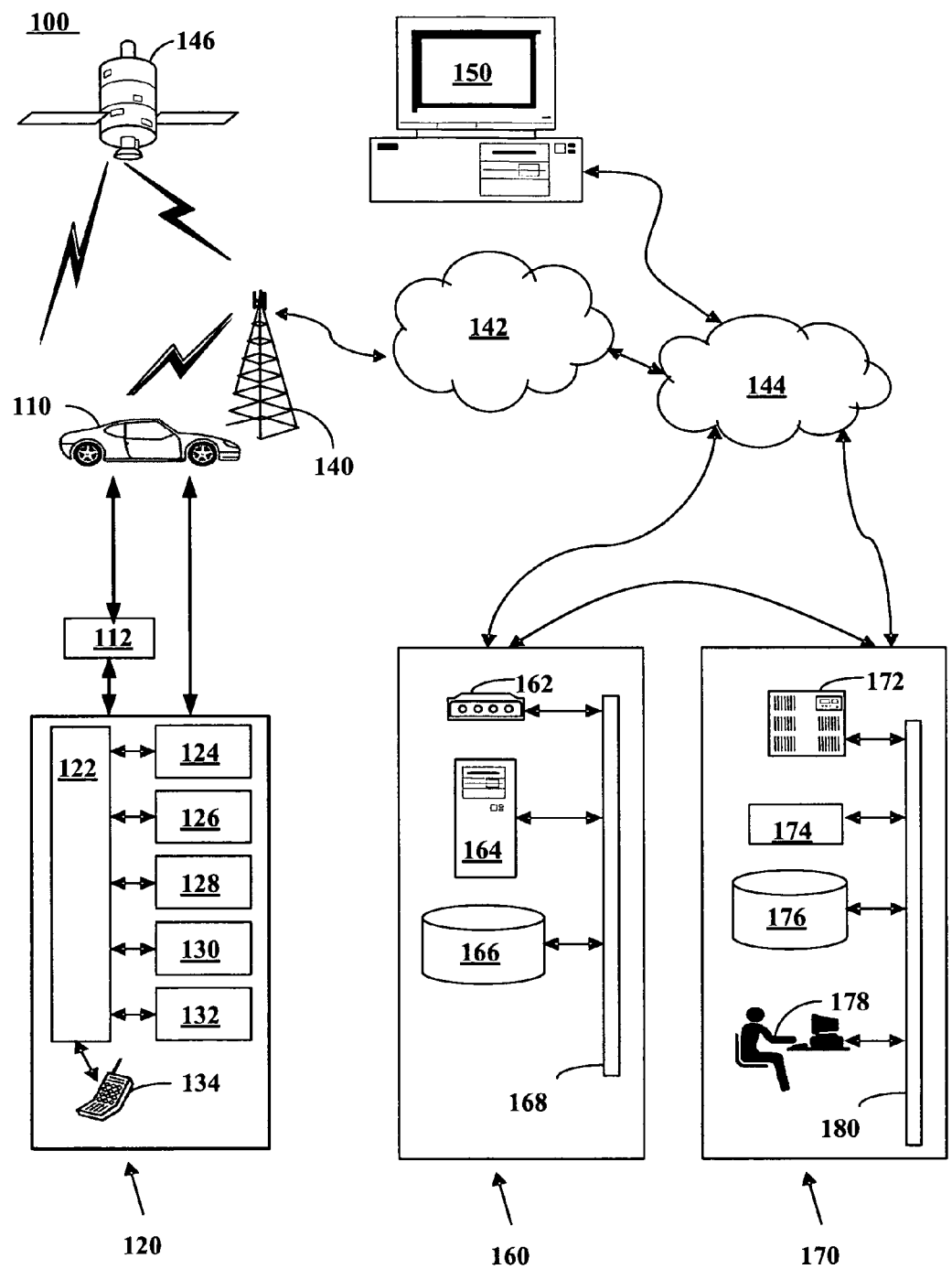
FIG. 1 illustrates an operating environment for a method for establishing communication with a mobile vehicle.

FIG. 1 illustrates an operating environment for a mobile vehicle communication system ("MVCS") 100 for navigation and asset management. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164 hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180. For example, communication services manager 174 may include at least one digital and/or analog modem.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
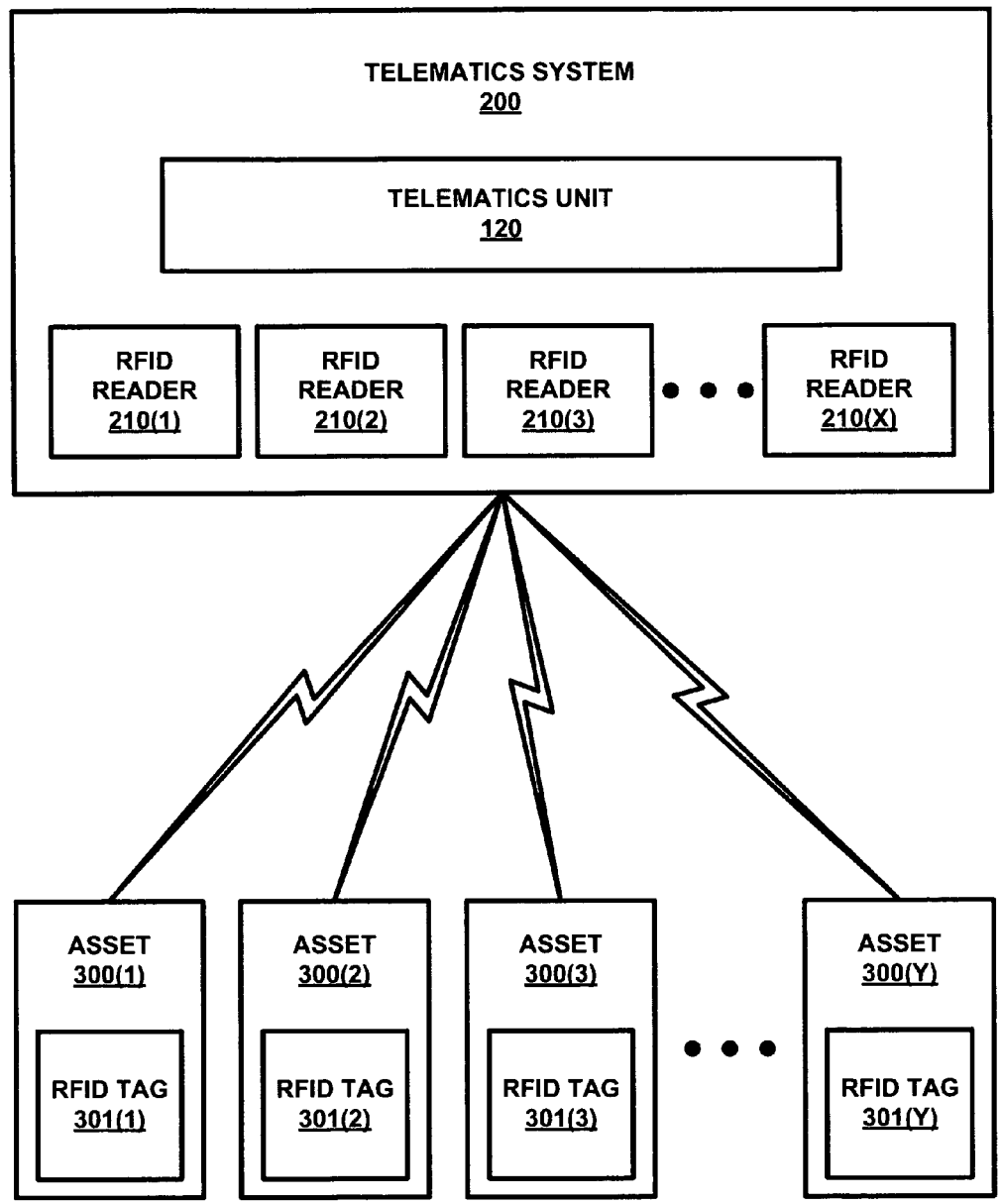
FIG. 2 illustrates one embodiment of an asset inventory and monitoring telematics system in accordance with the present invention.

FIG. 2 illustrates a telematics system 200 employing telematics unit 120 (FIG. 1) and X number of radio frequency identification ("RFID") readers 210, where $X \geq 1$. A reader 210 is capable of communicating with telematics unit 120 via a vehicle bus when the RFID reader 210 is segregated from telematics unit 120 or via a local bus within telematics unit 120 when the RFID reader 210 is integrated into telematics unit 120. Also shown are up to Y number of assets 300, each having a RFID transponder in the form of a RFID tag 301 adjoined thereto, where $Y \geq 1$. For purposes of the present invention, the term "asset" is broadly defined herein as any piece of property as to which a value can be assigned, such as, for example, a personal asset (e.g., money, a wallet, a purse, a compact disc, clothing, a piece of jewelry, a book, a bicycle, luggage, etc.) and a vehicle asset (e.g., a compact disc player, a seat, a steering wheel, etc.).

Figure 3:
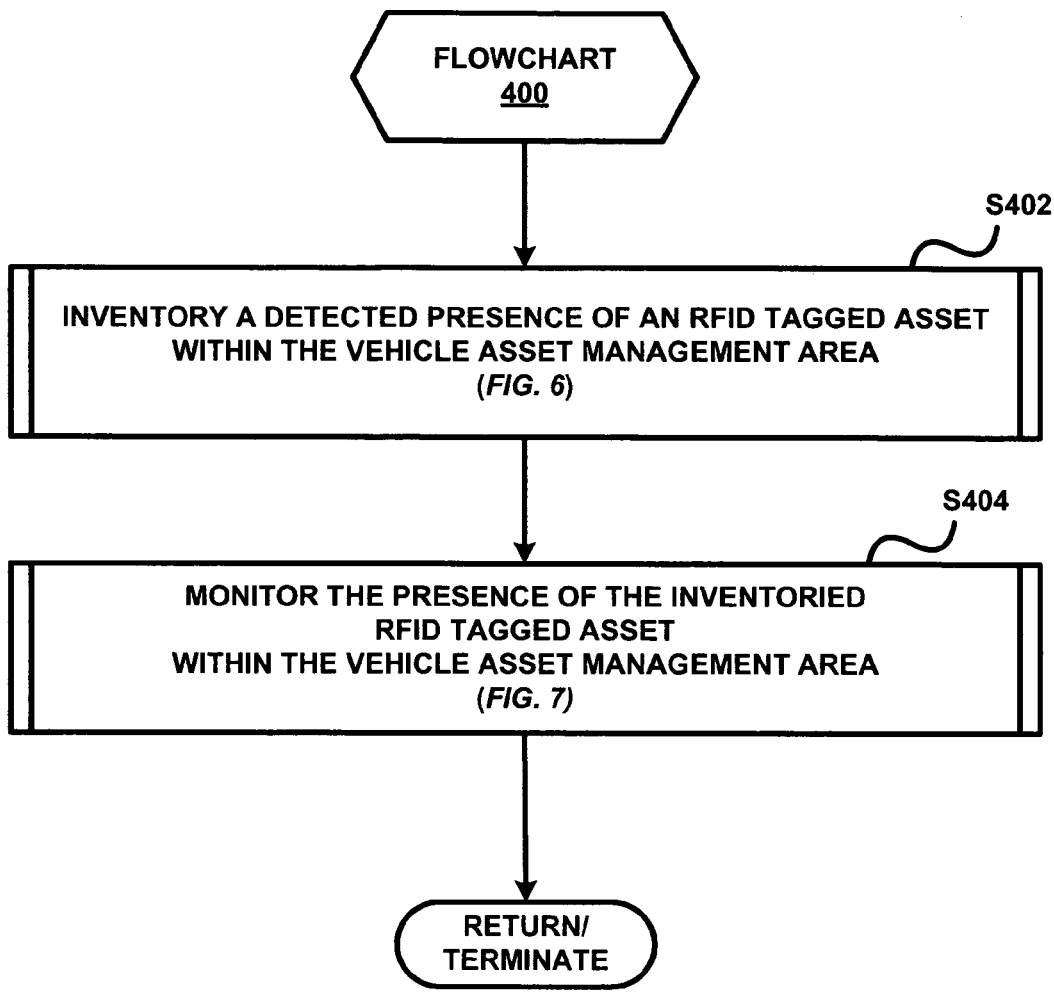
FIG. 3 illustrates a flowchart representative of one embodiment of an asset inventory and monitoring method in accordance with the present invention.

Telematics unit 120 implements an asset inventory and monitoring method of the present invention as represented by a flowchart 400 illustrated in FIG. 3. Flowchart 400 is implemented by telematics unit 120 based a detection of a presence of one or more assets within a vehicle asset management area of a vehicle. For purposes of the present invention, the term "vehicle asset management area" is broadly defined herein as an area of a vehicle delineated as a function of the RFID readers 210 that are incorporated for purposes of managing vehicle assets within the area, and can be described as an area that encompasses a vehicle's cab, a trunk/trunk bed, and/or hood. As will be appreciated by those having ordinary skill in the art, a perimeter of the vehicle asset management area is a function of a communication range of the RFID reader(s) 210, the physical dimensions of the vehicle, and the physical location(s) of the RFID reader(s) 210 relative to the vehicle (e.g., physically mounted adjacent to telematics unit 120 in a cab of the vehicle). In practice, an actual perimeter of the vehicle asset management area can be equal to or less than a maximum perimeter possible for the vehicle asset management area, a function of a communication range of the RFID reader(s) 210, the physical dimensions of the vehicle, and the physical location(s) of the RFID reader(s) 210 relative to the vehicle. Furthermore, the vehicle management area can be fixed or variable based on numerous factors (e.g., whether the vehicle is locked or unlocked, whether the vehicle is set in ignition ON or OFF, and/or whether the vehicle is parked or in motion).

Referring to FIG. 3, a stage S402 of flowchart 400 encompasses telematics unit 120 operating the RFID reader(s) 210 to inventory, temporarily or permanently, the detected presence of an asset within the vehicle asset management area, and a stage S404 of flowchart 400 encompasses telematics unit 120 operating the RFID reader(s) 210 that access(es) inventory data 220 and monitors the presence of the inventoried asset within the vehicle asset management area.

Figure 4:
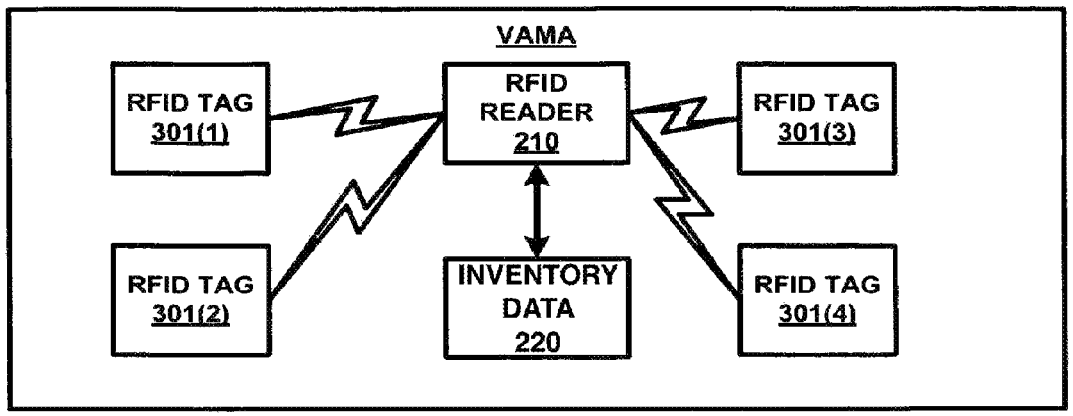
FIGS. 4 and 5 illustrate exemplary inventory and monitoring of assets located in an vehicle asset management area in accordance with the present invention.

For example, as shown in FIG. 4, a RFID reader 210 will inventory and then monitor the presence of assets 300(1)-300(4) having respective RFID tags 301(1)-301(4) as the presence of each asset within the vehicle asset management area VAMA is detected via respective RFID tags 301(1)-301(4) by RFID reader 210. In one embodiment, a cycle of stages S402 and S404 will continue, periodically or randomly or as commanded, for one or more of the assets 300(1)-300(4) until such time a presence of a particular asset is no longer detected by RFID reader 210 for a particular time period T or a particular Z number of external transmissions and/or failed transmissions between RFID reader 210 and a RFID tag 301.

Figure 5:
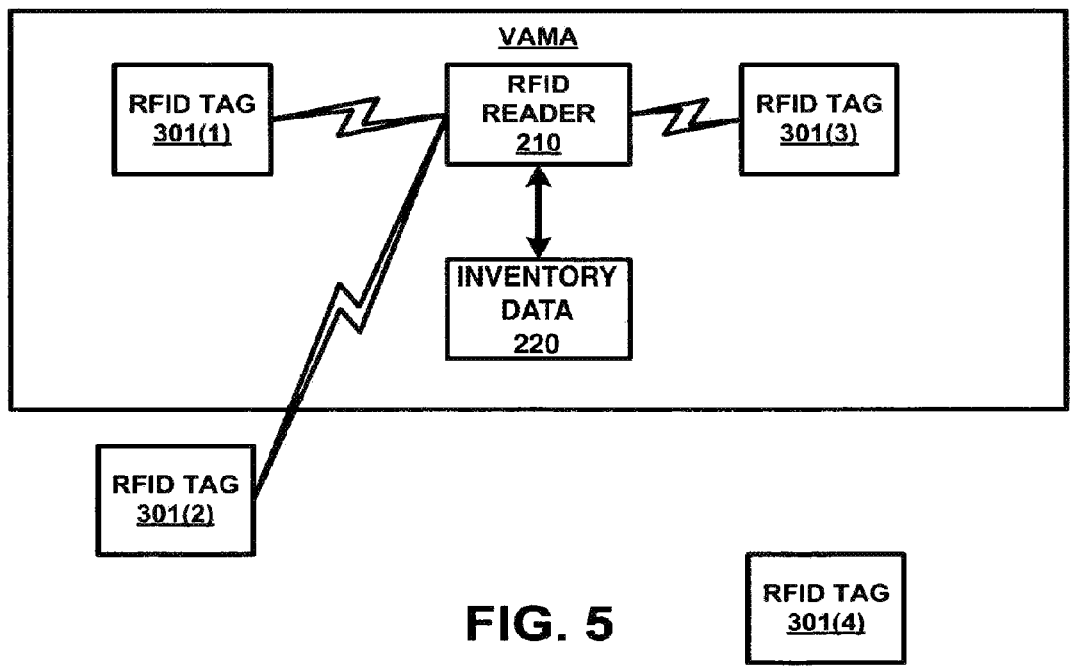

For example, as shown in FIG. 5, telematics unit 120 would cease operating RFID reader 210 to monitor asset 300(2) having RFID tag 301(2) adjoined thereto once RFID tag 301(2) has been determined to be external to vehicle asset management area VAMA in view of the communication distance between RFID reader 210 and RFID tag 301(2) after a time period T or after a particular Z number of transmissions between RFID reader 210 and RFID tag 301(2) at a distance external to vehicle asset management area VAMA. Also by example, as shown in FIG. 5, telematics unit 120 would cease operating RFID reader 210 to monitor the asset 300(4) having RFID tag 301(4) adjoined thereto once RFID tag 301(4) has been determined to be outside of the vehicle asset management area VAMA in view of the inability of RFID reader 210 to communicate with RFID tag 301(4) after a time period T or after a particular Z number of failed transmissions between RFID reader 210 and RFID tag 301(4).

Referring again to FIG. 3, in practice, the present invention does not impose any limitations or any restrictions as to the number and types of fields in an inventory record of an asset. In one embodiment, an inventory record includes one or more fields containing a portion or an entirety of the data stored on a RFID tag 301, and one or more fields containing monitoring data representative of a log history of an asset. Examples of RFID data include, but are not limited to, identification number and model numbers. Examples of monitoring data include, but are not limited to, a timestamp for each detection of the asset in the vehicle management area.

Also in practice, the present invention does not impose any limitations or any restrictions to the manner by which stages S402 and S404 are implemented by telematics unit 120. Thus, the following description of embodiments of stages S402 and S404 as shown in FIGS. 6 and 7, respectively, do no limit the scope of stages S402 and S404.

Figure 6:
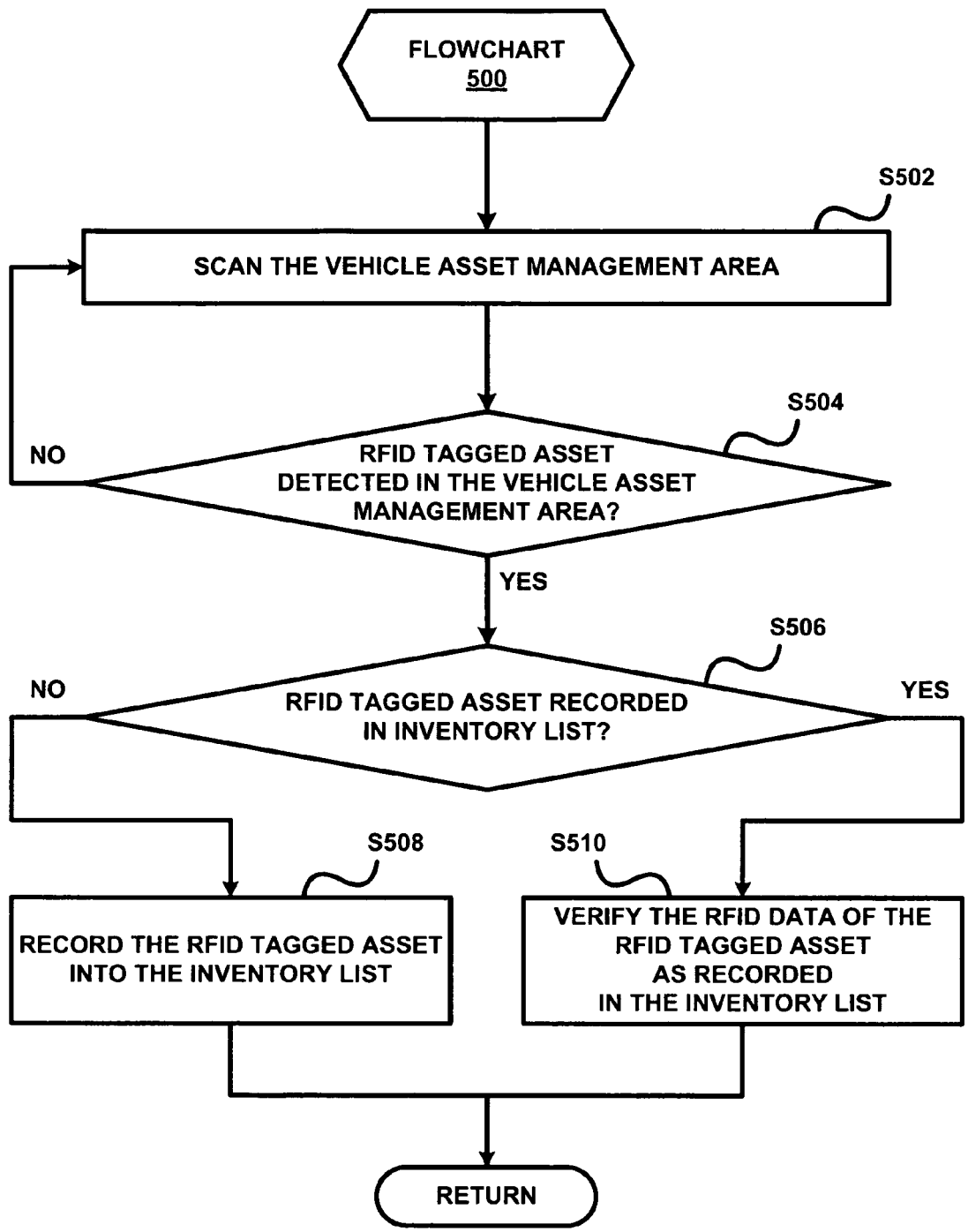
FIG. 6 illustrates a flowchart representative of one embodiment of an asset inventory method in accordance with the present invention.

FIG. 6 illustrates a flowchart 500 representative of one embodiment of stage S402 (FIG. 3). A stage S502 of flowchart 500 encompasses telematics unit 120 operating the RFID reader(s) 210 to scan the vehicle asset management area. A stage S504 of flowchart 500 encompasses telematics unit 120 determining if one or more assets are present in the vehicle asset management area. If not, then telematics unit 120 returns to stage S502 to re-execute stage S502 on a periodic basis, a random basis or a command basis. Otherwise, for each detected asset, telematics unit 120 proceeds to a stage S506 of flowchart 500 to determine whether to record the asset in an inventory list during a stage S508 of flowchart 500 for an initial detection of the asset in the vehicle asset management area, or to verify the RFID data of an already existing record of the asset in the inventory list during a stage S510 of flowchart 500.

Figure 7:
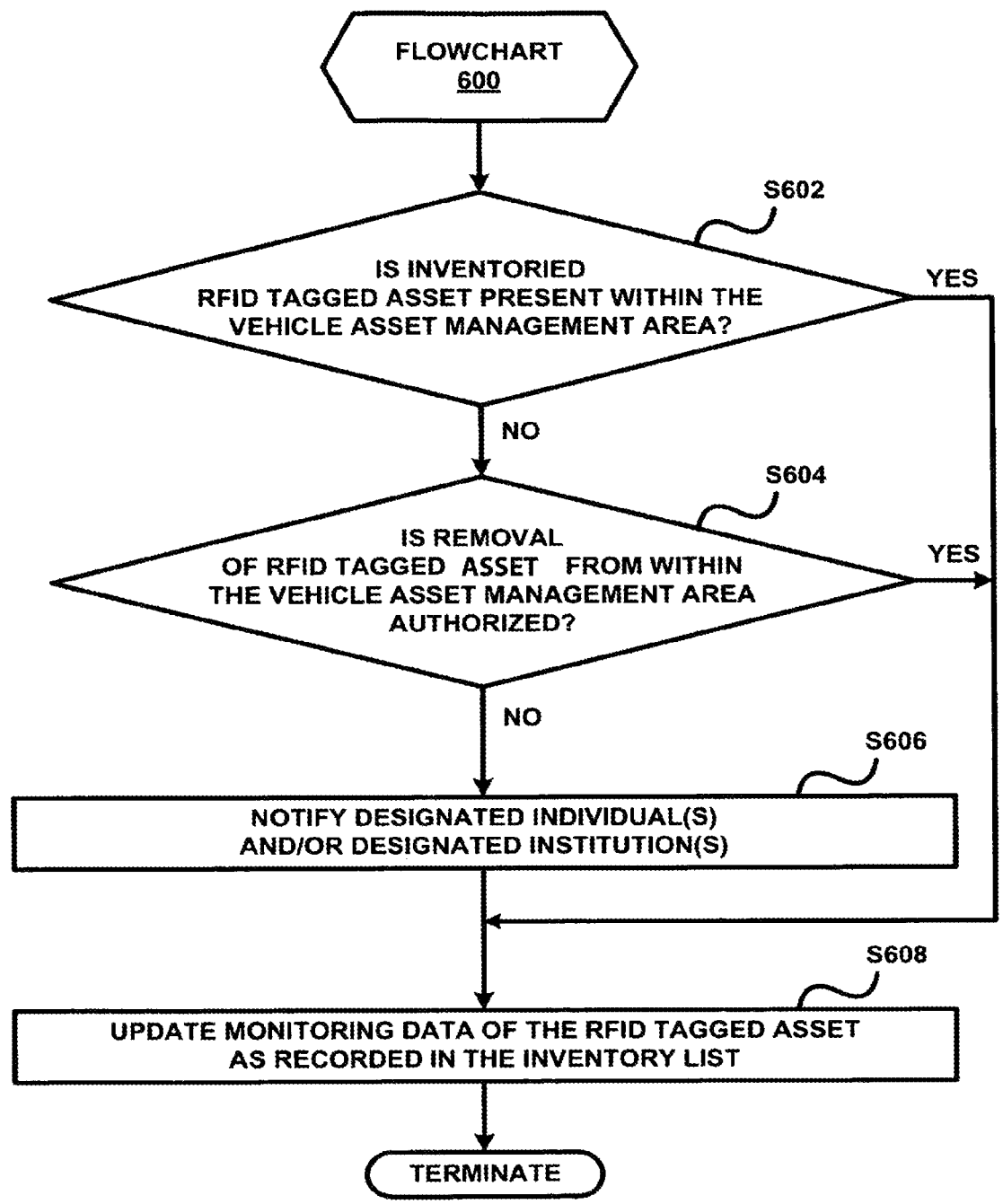
FIG. 7 illustrates a flowchart representative of one embodiment of an asset monitoring method in accordance with the present invention.

FIG. 7 illustrates a flowchart 600 representative of one embodiment of stage S404 (FIG. 3). A stage S602 of flowchart 600 encompasses telematics unit 120 determining whether an inventoried asset is present within the vehicle asset management area. Stage S602 is implemented by telematics unit 120 based on the scanning outcome of stage S502 (FIG. 6) for all assets recorded in the inventory prior to the scanning of the vehicle asset management area by RFID reader 210.

Telematics unit 120 updates monitoring data of asset previously recorded in the inventory list that is deemed to be present within the vehicle asset management area during a stage S608 of flowchart 600 to reflect the detected presence of the asset in the vehicle asset management area as a result of the scanning of the vehicle asset management area by RFID reader 210 during stage S502. Otherwise, telematics unit 120 proceeds to a stage S604 to determine if the removal of the asset from within the vehicle asset management area is authorized. In practice, the determination of whether a removal of the asset within the vehicle asset management area is authorized can be based on various factors, such as, for example, user input data related to the asset, a location of the vehicle, a location of the asset and/or an operational status of the vehicle.

One embodiment of the invention provides a method to reduce incidence of a false positive indication of unauthorized removals. In such embodiments, prior to issuing a notification, the system determines at least more data referencing the device, such as a GPS location, time of contact, ignition status or the like. For example, in the event that a bicycle is near the vehicle, such as in a garage, the RFID readers may conclude that the bicycle is on the rooftop rack, and track the location of the bicycle. Were a user to remove their vehicle from the garage, the RFID reader could determine that the bicycle had been removed from the roof rack without authorization—a false positive. To reduce such incidence, the system may make at least one more determination. For example, the GPS location of the vehicle while in contact with the bicycle can be compared to a user's home GPS location. In another example, the ignition status of the vehicle, including in one embodiment, a time-trigger, can be compared to the presence of the asset as an indication of the assets location. Thus, if the vehicle is in presence of the asset at a particular location, the ignition is then activated and the vehicle moves from the particular location and is no longer in contact with the asset, such a pattern could be indicative of a false positive. In one embodiment, such a pattern could also be compared to a user's home location to determine if the particular location were the user's home location, business location, or other similar 'safe' location. The time of day could also be compared to a user's driving history to further refine the determination of a potential false positive.

In another embodiment, the system tracks a first and second inventory of assets. For example, the first inventory is a list of permanent assets or assets that should persist with the vehicle for longer than a transient time span, while the second inventory is a list of temporary assets that are likely to persist with the vehicle for a transitory span of time. For example, a permanent asset includes, but is not limited to a vehicle seat, steering wheel, engine component and the like. A temporary asset includes, but is not limited to, a purse, compact disc, MP3 player, and the like. Embedded vehicle stereo equipment can be treated as either permanent or temporary, and in one embodiment, the embedded vehicle stereo equipment includes a RFID identifier indicative of the treatment of the equipment.

If authorized, telematics unit 120 updates monitoring data for a removed asset previously recorded in the inventory during a stage S608 of flowchart 600 to reflect an authorized removal of the asset from within the vehicle asset management area.

Otherwise, during a stage S606 of flowchart 600, telematics unit 120 notifies one or more designated individuals (e.g., an owner of the vehicle) and/or one or more designated institutions (e.g., a telematics call center or a police station) of an unauthorized removal of the asset from within the vehicle asset management area. An example of such notification includes, but is not limited to, activating a vehicle alarm and/or transacting an email, a page, a voicemail and/or a text message to the designated individual(s) and/or designated institution(s). During or after the notification, telematics unit 120 will proceed to stage S608 to update the monitoring data to reflect an unauthorized removal of the asset from within the vehicle asset management area.

Those having ordinary skill in the art will appreciate the numerous and varied advantages and benefits of the present invention from the description herein of FIGS. 2-7.

For example, one advantage of the present invention is to use the present invention as an automatic theft monitoring system. Specifically, in response to a vehicle event (e.g., the doors of a vehicle being locked), telematics unit 120 can be programmed to implement a theft monitoring session involving the inventory and monitoring of each asset within the vehicle asset management area on a periodic basis in accordance with flowchart 500 (FIG. 6) and flowchart 600 (FIG. 7). As such, the designated individual(s) and/or the designated institution(s) can be notified of any unauthorized removal of an inventoried asset from within the vehicle asset management area (e.g., removal without a key fob or other authorized means of unlocking the vehicle doors).

Another advantage of the present invention is to use the present invention as a manual theft monitoring system. Specifically, in response to an asset being manually scanned by RFID reader 210 by a user of the vehicle, telematics unit 120 can be programmed to implement a theft monitoring session involving the inventory and monitoring of each asset within the vehicle asset management area on a periodic basis in accordance with flowchart 500 (FIG. 6) and flowchart 600 (FIG. 7). As such, the designated individual(s) and/or the designated institution(s) can be notified of any unauthorized removal of an inventoried asset from within the vehicle asset management area (e.g., removal without a key fob or other authorized means of unlocking the vehicle doors).

A further advantage of the present invention is to use the present invention as a vehicle parts log. Specifically, a history of various vehicle parts within the vehicle asset management area, such as, for example, vehicle seats, control modules/devices, entertainment systems, and navigation systems can be obtained for informational purposes (e.g., maintenance or upholstery).

The present invention may be embodied in other specific forms without departing from the spirit or essential characteristics. The described embodiments are to be considered in all respects only as illustrative and not restrictive.

What is claimed is:

1. A method of tracking assets within a vehicle, the method comprising the steps of:
   (a) identifying assets to be monitored within a vehicle asset management area;
   (b) affixing radio frequency identification (RFID) tags to the identified assets;
   (c) placing the assets within the vehicle asset management area; and
   (d) using a telematics device having a RFID reader to determine which identified assets are within the vehicle asset management area, wherein step (d) is carried out in response to locking of doors; and
   (e) monitoring the vehicle asset management area using the RFID reader on the telematics unit until the doors are unlocked.

2. The method of claim 1, further comprising the step of notifying a customer if the RFID reader detects that an identified asset has moved out of the vehicle asset management area.

3. The method of claim 1, further comprising the step of creating an inventory list that contains a unique identifier for each RFID tag.

4. The method of claim 3, further comprising the step of adding to or subtracting from the inventory list when the RFID reader detects that an asset has moved into or out of the vehicle asset management area.

5. The method of claim 1, wherein the assets to be monitored are personal assets or vehicle assets.

6. The method of claim 1, further comprising the step of determining that a particular asset is outside the vehicle asset management area when the asset is moved to a location outside of the functional range of the RFID reader.

7. A method of tracking assets within a vehicle, the method comprising the steps of:
   (a) identifying permanent vehicle assets that remain in the vehicle longer than a transient time span;
   (b) associating the permanent vehicle assets with an identification number;
   (c) linking the permanent vehicle assets with radio frequency identification (RFID) tags;

(d) using a telematics device having a RFID reader to determine which permanent vehicle assets are within a vehicle asset management area; and (e) notifying a call center when a permanent vehicle asset is removed from the vehicle asset management area.

8. The method of claim 7, further comprising the step of creating an inventory list that contains a unique identifier for each RFID tag correlating to a defined vehicle asset.

9. The method of claim 7, further comprising the step of alerting a vehicle owner if the RFID reader detects that a defined vehicle asset has moved out of the vehicle asset management area.

10. The method of claim 7, wherein a defined vehicle asset is determined to have been removed from the vehicle asset management area when the recognized vehicle asset is outside the functional range of the RFID reader.

11. A method of tracking assets to be monitored within a vehicle, the method comprising the steps of:

(a) attaching a radio frequency identification (RFID) tag to a vehicle part;

(b) detecting the vehicle part within a vehicle asset management area using an RFID reader;

(c) generating a vehicle parts log which records that a vehicle part is located within the vehicle asset management area, wherein the vehicle parts log is associated with a particular identification number; and (d) updating the vehicle parts log when a vehicle part has moved into or out of the vehicle asset management area.

12. The method of claim 11, wherein the vehicle parts log further comprises a unique identifier for each RFID tag.

13. The method of claim 12, the step of updating the vehicle parts log further comprises adding a vehicle part to or subtracting a vehicle part from the vehicle parts log when the RFID reader detects that a vehicle part has moved into or out of the vehicle asset management area.

14. The method of claim 11, further comprising the step of notifying a central facility if the RFID reader detects that at least one vehicle part has moved out of the vehicle asset management area.

15. The method of claim 11, further comprising the step of notifying a vehicle owner when the RFID reader detects that at least one vehicle part has moved out of the vehicle asset management area.

16. The method of claim 11, wherein the vehicle parts log is created by a user manually recording a unique identifier for each RFID tag to be monitored.

17. The method of claim 11, wherein at least one vehicle part is determined to be outside of the vehicle asset management area when the at least one vehicle part within the vehicle asset management area is outside the functional range of the RFID reader.

* * * * *